A. H. VINCENT.
CORN HARVESTER.
APPLICATION FILED OCT. 29, 1917.

1,288,301.

Patented Dec. 17, 1918.
3 SHEETS—SHEET 1.

Inventor
A. H. Vincent.

Witness
F. C. Gibson.

By Victor J. Evans
Attorney

A. H. VINCENT.
CORN HARVESTER.
APPLICATION FILED OCT. 29, 1917.

1,288,301.

Patented Dec. 17, 1918.
3 SHEETS—SHEET 2.

Witness
F. C. Gibson.

Inventor
A. H. Vincent.
By Victor J. Evans
Attorney

A. H. VINCENT.
CORN HARVESTER.
APPLICATION FILED OCT. 29, 1917.

1,288,301.

Patented Dec. 17, 1918.
3 SHEETS—SHEET 3.

UNITED STATES PATENT OFFICE.

ARLIE H. VINCENT, OF BLADEN, NEBRASKA.

CORN-HARVESTER.

1,288,301.  Specification of Letters Patent.  Patented Dec. 17, 1918.

Application filed October 29, 1917. Serial No. 198,973.

*To all whom it may concern:*

Be it known that I, ARLIE H. VINCENT, a citizen of the United States, residing at Bladen, in the county of Webster and State of Nebraska, have invented new and useful Improvements in Corn-Harvesters, of which the following is a specification.

This invention relates to corn harvesters and it has for its object to produce a machine of this class which will possess superior advantages in point of simplicity, durability and general efficiency.

A further object of the invention is to produce a machine of this class having ear snapping or detaching apparatus of simple and improved construction.

A further object of the invention is to simplify and improve the means whereby the improved snapping device is actuated.

A further object of the device is to produce a machine of simple and improved construction whereby ears will be detached from the stalks standing in the field and subsequently husked before being delivered to a receptacle such as the box of a wagon traveling alongside of the improved machine.

With these and other ends in view which will readily appear as the nature of the invention is better understood, the same consists in the improved construction, novel arrangement and combination of parts which will be hereinafter more fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Fig. 4 is a transverse sectional view taken on the line 4—4 in Fig. 1.

Fig. 5 is a rear elevation.

Fig. 7 is a detail plan view of the husking device.

Corresponding parts in the several figures are denoted by like characters of reference.

Figure 1:
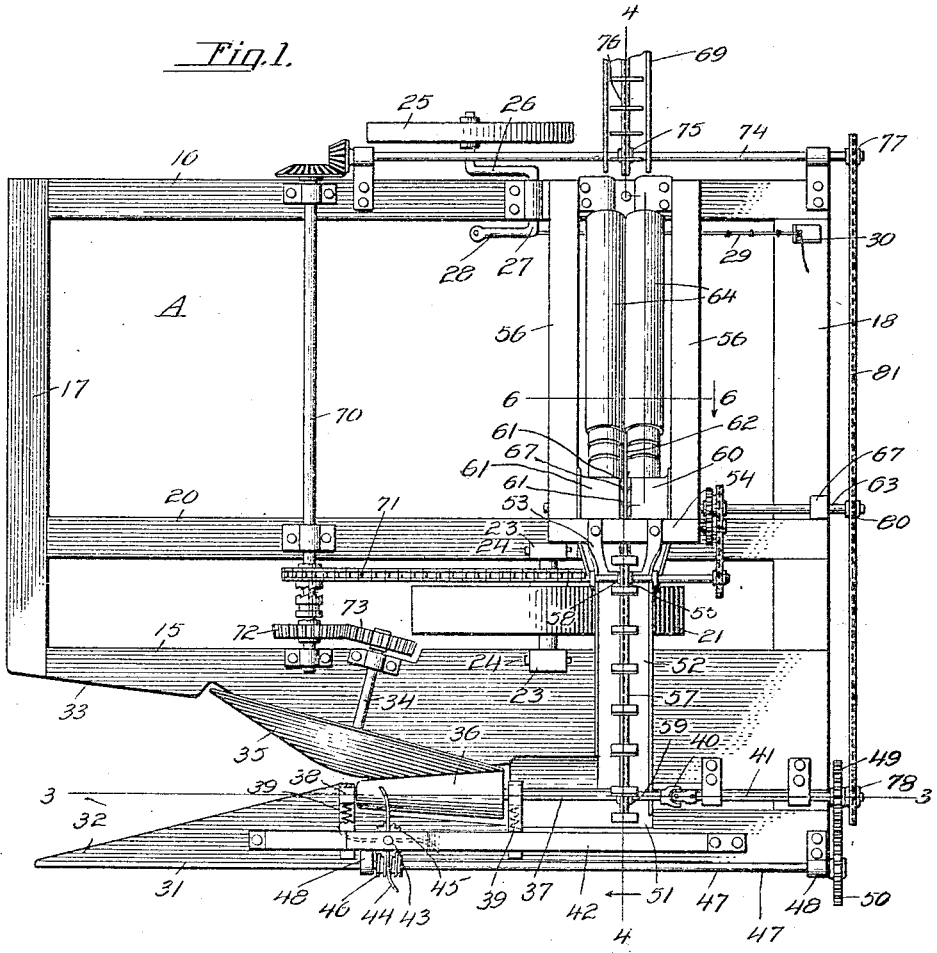
Figure 1 is a top plan view of a machine constructed in accordance with the invention.
Figure 6:
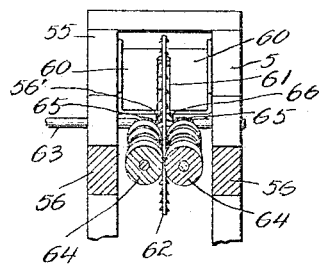
Fig. 6 is a sectional detail view taken on the line 6—6 in Fig. 1.

The frame A of the improved machine is of substantially rectangular form, said frame including side members 15, 16, front and rear end members 17, 18 and a longitudinal bar 20, the latter being suitably spaced from the side member 15 to accommodate the bull wheel 21, the axle of which is journaled in slides 22 mounted in arcuate guides 23 to permit adjustment of the bull wheel relatively to the frame so that the latter may be raised or lowered as desired. The slides 22 may be secured with respect to the guides 23 by any suitable well known means such as by locking pins or bolts 24, it being obvious that by properly jacking up the frame adjustment of the bull wheel may be effected. The side member 16 of the frame is supported on a grain wheel 25 mounted on a crank 26 of a rock shaft 27 having another arm 28 with which is connected one end of a flexible adjusting element 29, the other end of which may be adjustably connected with a lug 30 for the purpose of effecting adjustment of the grain wheel whereby the frame member 16 will be supported at a desired distance above the ground.

Figure 2:
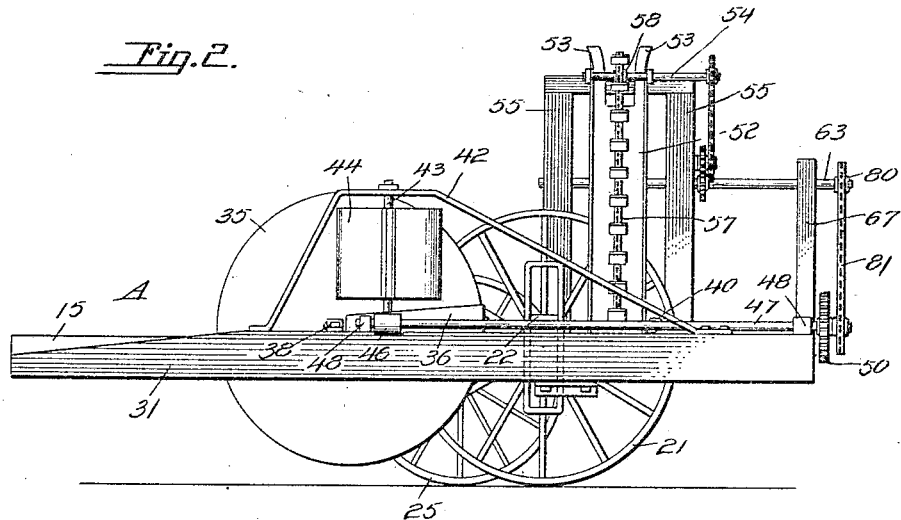
Fig. 2 is a side elevation.
Figure 3:
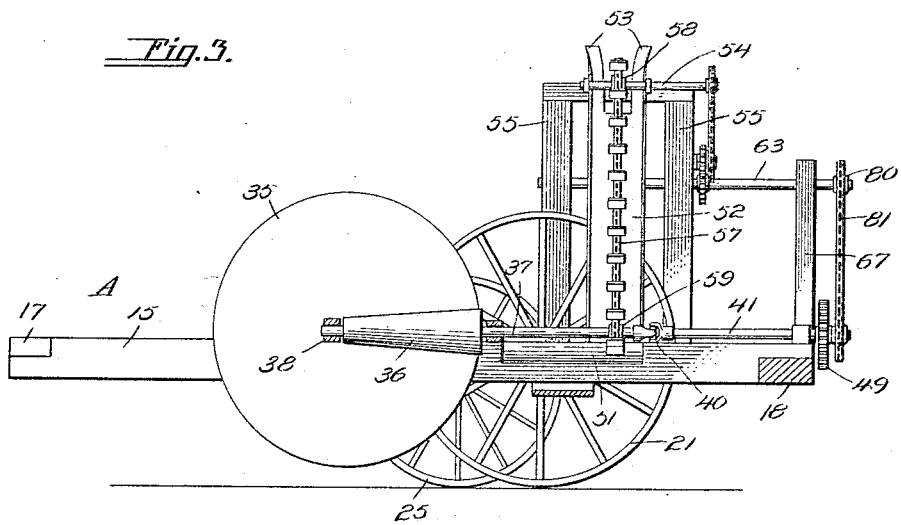
Fig. 3 is a longitudinal sectional view taken on the line 3—3 in Fig. 1.

Supported in spaced relation to the side member 15 of the frame is a gathering arm or bar 31, the forward end of which is beveled at 32, the opposed face of the frame member 15 being also beveled at 33 for the admission of stalks of corn between the gathering arm and the frame member. Supported on the frame member 15 in an oblique or inclined position is a shaft 34 carrying an element which may be described as a conical disk 35 which constitutes one of the snapping elements, the other snapping element consisting of a roller 36 carried by a shaft 37 which is mounted in bearings 38 on the rearward portion of the gathering arm 31, said bearings being forced or pressed by springs 39 in the direction of the conical disk 35 so that the snapping roll 36 will be forcibly held in engagement with the conical engaging face of said disk to the rearward of the axis of the shaft on which the disk is mounted, the engagement of the roll with the disk being however resilient so as to permit the passage of stalks therebetween. It is considered desirable to state that the element described as the conical disk 35 should be low or flat when considered as a cone; that is to say the length of its axis should be materially considerably less than the diameter of the base thereof. The apex is preferably rounded as shown to facilitate the entrance of corn stalks between the face of the disk and that of the roller 36 co-acting therewith. The roller 36 should preferably be of such length that it will contact the external face of the conical disk 35 between the apex and the base of the latter. It follows that the diameter of the disk will be nearly equal to twice the length of the roller. Approximately one-half of the disk will, therefore, extend forwardly of the roller, and this portion of the disk will be found to materially assist in gathering the corn stalks and inducing the same to pass between the co-acting faces of the disk and the roller. Moreover, a considerable portion of the disk will extend upwardly with respect to the roller as best seen in Figs. 2 and 3, and this portion of the disk will materially assist in guiding the detached ears in the proper direction as well as constitute a shield to prevent such ears from falling in the wrong direction. The shaft carrying the disk 35 is driven by means to be hereinafter described and it is found that the disk coacting with the single snapping roll will serve to detach the ears from the stalks in an extremely efficient manner, there being much less liability of jamming or breakage of the parts than where a pair of snapping rolls are employed.

The roll carrying shaft 37 is connected by a universal joint 40 with the forward end of a driven shaft 41 which latter extends rearwardly of the frame of the machine which is driven by means to be hereinafter described. A brace or bracket member 42 which is mounted on the gathering arm 31 affords a bearing for the upper end of a shaft 43 carrying a reel 44 which operates in proximity to the upper rearward portion of the disk 35, the lower end of the reel carrying shaft being stepped in the gathering arm and provided with a gear 45 meshing with a worm 46 on a longitudinal shaft 47 which is supported for rotation in bearings 48 on the gathering arm and which receives motion from the shaft 41 by means of intermeshing spur gears 49, 50. The opposed faces of the frame member 15 and the gathering arm 31 are provided with concavities or recesses combining to form a trough 51 that receives ears of corn detached from the stalks by the snapping mechanism. 52 is an elevator trough, the upper end of which is bifurcated to form arms 53 which are spaced apart and which are supported on a cap piece 54 mounted on uprights 55 rising from the frame bar 20, said uprights being connected with the frame member 16 by inclined bars or braces 56. The lower end of the elevator trough 52 dips into the trough 51, and over said elevator trough is trained an elevator chain 57, said chain being trained over sprockets 58, 59 at the upper and lower ends respectively of the trough 52.

Mounted between the uprights 55 is a pan 60 to receive the ears discharged over the elevator trough 52. The pan 60 has a slot 61 wherein is accommodated the upper portion of a disk 62 carried by a shaft 63 having its bearings in the uprights 55. Suitable bearings are also provided for the upper and lower ends of a pair of inclined husking rolls 64 which are supported for rotation between the inclined bars or braces 56, said husking rolls being driven by beveled pinions 65 intermeshing with beveled pinions 56 on the shaft 63. The disk 62 on the shaft 63 is provided with circumferential series of sharp hooks 67 for the passage of which the husking rolls are provided with annular grooves 68, the purpose of these hooks being to loosen the husks on the ears so that the husks will be readily seized by the husking rolls and detached from the ears, the latter gravitating to the lower ends of the husking rolls where they are received by an elevator 69 and discharged into a receptacle such as the box of a wagon that may be driven alongside of the harvester. The husking rolls may be spring pressed in the direction of each other to insure the efficient operation thereof.

70 designates the main driven shaft of the machine which is arranged in concentric relation with respect to the arcuate guides 23 that support the slides carrying the bull wheel 21 from the shaft to which motion is conveyed by a transmission chain 71 to the shaft 70. The latter carries a beveled gear 72 meshing with a beveled gear 73 on the shaft 34 which carries the snapping disk 35. The main shaft 70 transmits motion by means of intermeshing beveled gears to a longitudinal shaft 74 supported on the frame member 16, said shaft carrying a sprocket wheel 75 that drives the elevator chain 76 in the elevator 69. The shaft 74 and the shaft 41 are each provided with sprocket wheels 77, 78 and the shaft 63 which carries the disk 62 has an additional bearing in an upright 79, said shaft carrying also a sprocket wheel 80. A chain 81 trained over the sprocket wheels 77, 78 and 80 serves to drive the snapping mechanism and the husking mechanism through the instrumentalities previously described, the shaft whereby motion is transmitted to the reel, being likewise driven.

The shaft carrying the sprocket wheel 58 at the upper end of the elevator trough 52 may receive motion by a suitable transmission from the shaft 63 carrying the disk 62 of the husking mechanism, said shaft 63 being driven as herein previously described.

From the foregoing description taken in connection with the drawings hereto annexed, the operation and advantages of the improved machine for harvesting corn will be readily understood. The parts of the machine are few and simple and they are constructed and arranged in such a manner as to produce the most efficient results.

What is claimed, is:—

1. In a corn harvester, a conical snapping disk arranged with its axis oblique to the line of draft so that the front side of said disk diverges forwardly from the line of draft, a gathering element opposite the front side of the disk and converging rearwardly toward the apex thereof so that the front side of the disk and the said gathering element form a rearwardly contracting throat between them, and a substantially horizontal snapping roller in rear of said throat and opposing and coacting with the rear side of the disk.

2. In a corn harvester, a conical snapping disk arranged with its axis oblique to the line of draft so that the front side of said disk diverges forwardly from the line of draft, a gathering element opposite the front side of the disk and converging rearwardly toward the apex thereof so that the front side of the disk and the said gathering element form a rearwardly contracting throat between them, and a substantially horizontal snapping roller in rear of said throat and opposing and coacting with the rear side of the disk, the apex of the disk being rounded and being spaced from the rear end of said gathering element.

3. In a corn harvester, a conical snapping disk arranged with its axis oblique to the line of draft so that the front side of said disk diverges forwardly from the line of draft, a gathering element opposite the front side of the disk and converging rearwardly toward the apex thereof so that the front side of the disk and the said gathering element form a rearwardly contracting throat between them, and a substantially horizontal snapping roller in rear of said throat and opposing and coacting with the rear side of the disk, bearings for the snapping roller mounted for movement toward and from the disk and springs yieldably holding the roller against the rear side of the disk.

4. In a corn harvester, a conical snapping disk arranged with its axis oblique to the line of draft, so that the front side of the disk diverges forwardly from the line of draft, and a substantially horizontally arranged snapping roller engaging the rear side of the disk, the front end of the roller being spaced to the rear of the apex of the disk and being diametrically reduced to enable ears to enter between the disk and the roller.

5. In a corn harvester, a snapping disk of flat conical form, means for driving said disk, a substantially horizontal snapping roller co-acting with the disk and engaging the external face between the apex and the base thereof, said disk having a substantially horizontally arranged axis diverging rearwardly from the line of draft and said disk extending forwardly, upwardly and downwardly with respect to the roller, and means for driving the roller, the apex of the disk being rounded and the roller being spring pressed in the direction of the disk.

6. In a corn harvester, a frame having a side member and a gathering arm opposite said member, said member and arm presenting opposite rearwardly inclined and rearwardly converging edges to form an opening for the admission of corn stalks, an obliquely disposed driven shaft mounted on the frame member and diverging rearwardly from the line of draft, a flat conical snapping disk carried by said shaft and a substantially horizontal driven shaft supported for rotation on the gathering arm and carrying a snapping roll coöperating with the disk.

7. In a corn harvester, a frame having a side member and a gathering arm opposite said member, said member and arm presenting opposite rearwardly inclined and rearwardly converging edges to form an opening for the admission of corn stalks, an obliquely disposed driven shaft mounted on the frame member and diverging rearwardly from the line of draft, a snapping flat conical disk carried by said shaft and a substantially horizontal driven shaft supported for rotation on the gathering arm and carrying a snapping roll spring-pressed in the direction of the disk and engaging a portion between the apex and the base thereof.

8. In a corn harvester, a frame having a side member and a gathering arm, said side member and gathering arm presenting oppositely inclined rearwardly converging edges forming a rearwardly contracting throat for the admission of corn stalks, a flat conical snapping disk supported with its axis in an oblique position on the beveled frame member and diverging rearwardly from the line of draft, a shaft supported for rotation in bearing members on the gathering arm, a substantially horizontal snapping roll carried by said shaft engaging and coacting with the snapping disk, means for pressing the bearings of the roll carrying shaft in the direction of the snapping disk, and means for driving the snapping roll including a driven shaft and a universal joint connection between said shaft and the shaft carrying the snapping roll.

9. In a corn harvester, a flat conical snapping disk, arranged with its axis substantially horizontal and diverging rearwardly from the line of draft, a substantially horizontal snapping roller co-acting with the external surface of said snapping disk at one side of the axis of the latter, means for driving the disk and the roller, said snapping disk having a rounded apex and said snapping disk extending forwardly, upwardly and downwardly with respect to the snapping roller and a supporting frame having a gathering arm with the upgoing portion of the snapping disk that extends in advance of the snapping roller coöperates.

10. In a corn harvester, a frame having a side member and a gathering arm, said member and arm having opposing rearwardly converging oblique sides, and said arm and frame member having recesses in their opposed faces combining to form a receiving trough, a driven conical snapping disk having a horizontal driving shaft arranged at an angle to and diverging rearwardly from the line of draft and a driven snapping roll coöperating therewith, and substantially horizontally arranged and engaging the rear side of the disk so that ears detached by the snapping disk will be thrown into the receptacle, a driven elevator dipping into the receptacle and conveying the ears in an upward direction, and a husking mechanism arranged to receive the ears discharged over the elevator.

11. In a corn harvester, a frame having a side member and a gathering arm, said member and arm having opposing rearwardly converging oblique sides and said arm and frame member having recesses in their opposed faces combining to form a receiving trough, a driven conical snapping disk having a horizontal driving shaft arranged at an angle to and diverging rearwardly from the line of draft and a driven snapping roll coöperating therewith, and substantially horizontally arranged and engaging the rear side of the disk so that ears detached by the snapping disk will be thrown into the receptacle, a driven elevator dipping into the receptacle and conveying the ears in an upward direction, and a husking mechanism arranged to receive the ears discharged over the elevator, said husking mechanism comprising husking rolls, a receiving pan having a slot, and a driven disk operating in said slot, said disk having husk loosening hooks and the husking rolls being provided with annular grooves for the accommodation of said hooks.

In testimony whereof I affix my signature.

ARLIE H. VINCENT.

Copies of this patent may be obtained for five cents each, by addressing the "Commissioner of Patents, Washington, D. C."